Dec. 13, 1960 E. BRASSEUR 2,964,324

SOUND RECORDING AND REPRODUCING APPARATUS

Filed Aug. 22, 1955 2 Sheets-Sheet 1

Dec. 13, 1960 E. BRASSEUR 2,964,324

SOUND RECORDING AND REPRODUCING APPARATUS

Filed Aug. 22, 1955 2 Sheets-Sheet 2

United States Patent Office 2,964,324

Patented Dec. 13, 1960

2,964,324

SOUND RECORDING AND REPRODUCING APPARATUS

Eudore Brasseur, Charleroi, Belgium, assignor to Ateliers de Constructions Electriques de Charleroi, Brussels, Belgium, a corporation of Belgium Filed Aug. 22, 1955, Ser. No. 529,609

Claims priority, application France Jan. 17, 1955

1 Claim. (Cl. 274—4)

The present invention relates to improvements in sound recording and reproducing devices in which an elongated sound track receiving or bearing record is intermittently advanced with a step-by-step movement and the recording and reproducing head moves in alternately reverse directions generally across the record during the periods of rest of the record.

The invention is particularly applicable to sound recording and reproducing devices of the electro-magnetic type, in which the record incorporates at least a layer of magnetizable material responsive to the head so as to form a sound track on the record when the device is recording, and to play back the sound from the sound track when the device is reproducing.

In prior devices of this type the control of the movement of the head in one direction or the other is independent of the direction of recording of the particular transverse run of the sound track with which the head cooperates, that is, it is possible to place the record on the device for reproduction of sound so that the particular transverse run of the sound track cooperating with the head will prove to have been recorded in a direction opposite from the direction in which the head will first move in reproducing the record. To overcome this difficulty, it has formerly been necessary to incorporate in the device a means which is manually operated after the operator has listened to the first portion of the reproduction, to bring the direction of movement of the head into conformity with the direction of recording of the initial transverse run of the sound track.

In accordance with the present invention, the means for traversing the head and the means for intermittently advancing the record are so connected that during reproduction the direction of traverse of the sound head is automatically correlated with the intermittent feeding of the record so that the movement of the head during reproduction automatically takes place in the same direction in which the sound track was recorded on the record. Specifically, the device of the invention includes a first means for advancing the record in a first series of alternate steps and a second means for advancing the record in the other series of alternate steps, such two record-advancing means being alternately energized by means connected to the head so that when the head is in a first terminal position, at one side of the record, only the first record-advancing means is energized, and so that when the head is in its other terminal position, at the other side of the record, only the second record-advancing means is energized. Such mechanism, in combination with recording engaging means which positively engages the record in a position only when the record is correctly placed with respect to the head, insures that the record will be correctly reproduced without the necessity of manually operated means to bring the traverse of the head into correct phase with respect to the sound track.

Figure 1:
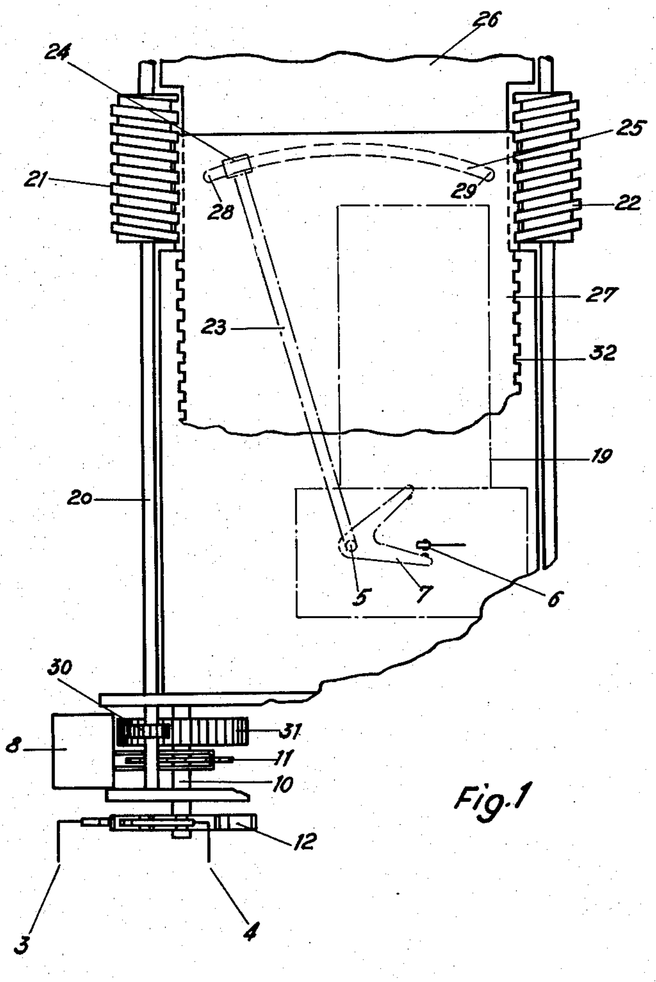
Figure 2:
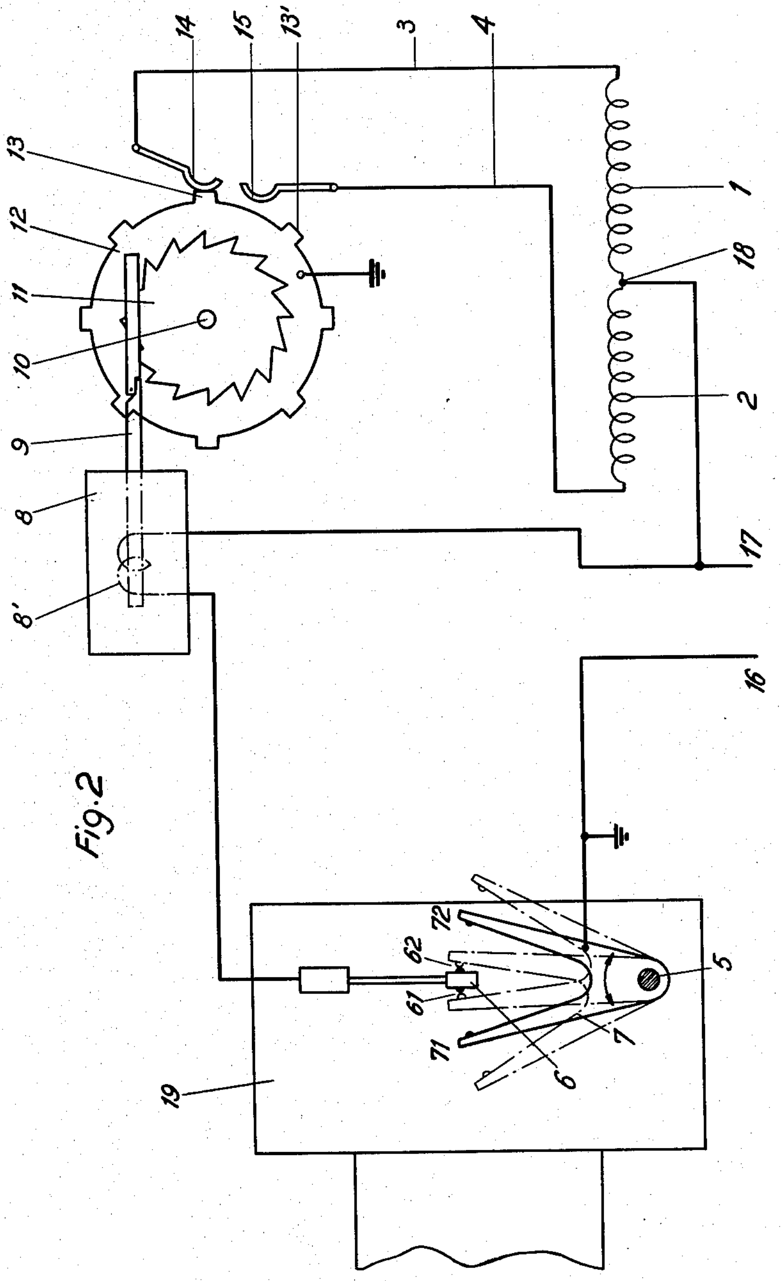

The sound recording and reproducing device of the invention is particularly described below in conjunction with the accompanying drawings, in which Fig. 1 is a diagrammatic fragmentary view in plan of the device, and Fig. 2 is a schematic view and wiring diagram of the mechanism for controlling movement of the sound recording and reproducing head and of the sound track bearing recording of the device.

In Fig. 1 there is shown a portion of a sound recording and reproducing device of a presently preferred embodiment of the invention. Such device incorporates a horizontal record-supporting table 26 having an arcuate slot therein, indicated by dotted lines. An electromagnetic sound recording and reproducing head 24, beneath the table 26, and connected to the end of arm 23, affixed to a vertical shaft 5, oscillates between terminal positions 28 and 29 of the slot in the table. An elongated sound track receiving and bearing record 27, incorporating at least a layer of magnetic material lies upon the table 26, as shown, and is driven by means to be described with a step-by-step movement past the slot in the table and longitudinally of the record, each movement of the record occurring immediately after the head 24 has reached one of the termini 28, 29 of the slot. As a result, when the device is recording sound, it creates a zigzag sound track upon the record, such sound track being composed of a series of parallel arcuate runs lying generally transverse to the length of the record, successive runs of the sound track being connected by short runs along the sides of the record and lying parallel thereto.

The shaft 5 bearing the head 24 is oscillated by a mechanism such as that shown and described in the related patent application Serial No. 529,608, filed August 22, 1955, which corresponds to French patent application Serial No. 682,189, filed December 21, 1954. Preferably the mechanism for oscillating shaft 5 there shown comprises a piston, specifically a solenoid plunger, which is alternately moved in reverse directions by a driving mechanism. A crank and lever system connects the piston or solenoid plunger to the shaft 5, whereby to oscillate the shaft upon reciprocation of the piston. In the embodiment of the driving means for the head, here fragmentarily illustrated, the piston or solenoid plunger is reciprocated by two alternately energized solenoid cells 1 and 2.

The record 27 is provided with a series of edge notches 32 along each longitudinal edge thereof, such edge notches meshing with the respective one of the two worm gears 21 and 25 which are mounted on opposite sides of the table 26 parallel to the length thereof and with their axes lying generally in the plane of the record lying on the table 26. Preferably, as shown, the worm gears 21 and 25 are of opposite hand, so as to maintain the record stably on the table 26 during record-driving rotation of the worm gears. The worm gears are connected together, by means not shown, and are driven at the same speed by means comprising a ratchet wheel 11 which is intermittently rotated by a solenoid 8 having a solenoid coil 8', and a plunger 9 which is biased to the right (Fig. 2) by a spring means not shown. As shown in Fig. 1, ratchet wheel 11 and gear 31 are mounted to rotate together on shaft 10. Gear 31 meshes with the smaller gear 30 on shaft 20. When the solenoid coil 8' is energized by the supply circuit having lead wires 16 and 17, the plunger 9 is pulled to the left in Fig. 2, thereby causing ratchet wheel 11 to rotate one step counterclockwise by engagement of a ratchet wheel engaging blade, mounted on the end of plunger 9, with the ratchet wheel.

The device of the invention incorporates controlling mechanism whereby record-advancing movement of the worm gears takes place only after the sound recording and reproducing head has reached each terminus of its travel. The control device further is so constructed and arranged that when the record 27 bearing a recorded sound track thereon is mounted on the machine at an initial reproducing position longitudinally thereof with respect to the path of travel of the head, the initial sound-reproducing traverse of the head will automatically be in the correct position to reproduce the sound on the record; in other words, the head will automatically travel in the same direction in which the sound track was recorded.

Such control means, shown in detail in Fig. 2, comprises a first switch having a V-shaped contactor 7 fixedly mounted on the oscillating shaft 5. As shown, contactor 7 is connected to the grounded lead 16 from a current source, not shown. The first switch has a central fixed contact block 6 bearing opposite contacts 61 and 62 which cooperate, respectively, with the contact points 71 and 72 mounted adjacent the outer end of each arm of the movable contactor 7. The switch is so arranged that, when the head 24 is in one terminal position, the energizing circuit for the solenoid 8' is completed through the contacts 61 and 71 of the switch, and then when the head 24 is in its other terminal position, the energizing circuit for the coil 8' of the solenoid is completed through contacts 62 and 72.

Mounted on shaft 10 to rotate with ratchet wheel 11 is a movable grounded contactor 12 of a second switch. Contactor 12 has a series of radial projections 13, 13', on its outer rim, there being half as many of such projections as there are operative teeth on the ratchet wheel 11. A fixed contactor blade 14 is mounted angularly with respect to contactor 12 so that a circuit is completed between a projection 13 of contactor 12 and blade 14 each time the ratchet wheel 11 has completed one of a first alternate series of record-advancing partial rotations. As shown, the projections 13 on contactor 12 and switch blade 14 function alternately to energize and de-energize the coil 1 of the first solenoid through the circuit 3, 18 and 17. The first solenoid impels the sound head 24 in one direction. Thus, the solenoid 1 and the sound head 24 are driven in said first direction only at the end of each of the first alternate sets of record-advancing movements.

A second fixed switch blade 15 is positioned outwardly of the contactor 12 at a position displaced from the switch blade 14 at an angle equalling the angle between successive operative ratchet teeth on the ratchet wheel 11. Switch blade 15 is interposed in the energizing circuit 4, 18, and 17, for the second solenoid 2 for energizing the head-driving solenoid plunger in the second reverse direction. Solenoid coil 2 is, therefore, energized when the ratchet wheel 11 and the contactor 12 are moved counterclockwise from the position of Fig. 2 through an angle equalling the angle between operative ratchet teeth on ratchet wheel 11. In such position the projection 13' on contactor 12 contacts switch blade 15, and the contact between the switch blade 14 and contactor 12 is broken. Solenoid coil 2, therefore, moves the sound head in the second, reverse direction only after each of the second alternate series of record movements.

It will be seen that with the apparatus disclosed, solenoid coil 1 functions to advance the record only when the head 24 has reached a given one of its termini, and that solenoid coil 2 will be energized only when head 24 has reached the other one of its termini. Thus, the machine establishes a fixed correlation, not only between the timing of the step-by-step record advance, but also between the direction in which the sound track on the record was recorded and the direction in which the head moves to reproduce the sound track.

It is desirable to insure that during the reproduction of sounds the record will be correctly positioned on the device regardless of the position in which the record has been mounted thereon. To accomplish this result, the pitch of the notches 32 along the edges of the record 27, and the pitch of the worm gears 21, 22 meshing therewith, are made to be an even multiple of the distance separating two successive transverse runs of the sound track as recorded on the record.

While a preferred embodiment has been shown by way of example in the drawings and particularly described, it will be understood that the invention is in no way limited to this single embodiment.

What I claim and desire to secure by Letters Patent is:

An electromagnetic sound recording and reproducing device using an elongated record incorporating at least a layer made of magnetizable material and having a series of notches disposed longitudinally thereof, said device having an electromagnetic sonic vibration recording and reproducing head, the improvement which comprises, first means including at least one gear engaging said notches for positively advancing the record in a step-by-step movement longitudinally thereof, second means for moving the head between terminal positions in opposite directions generally transverse to the direction of movement of the record during successive periods in which the record is at rest to form on the record a sound track composed of uniformly spaced runs extending generally transverse to the length of the record and connected at their ends by short runs extending longitudinally of the record, said second means comprising two solenoid coils, a control switch for energizing alternatively the first solenoid in one of the terminal positions of the head and the second solenoid coil in the other terminal position, third means responsive to movement of the head and actuated when the head reaches each of the terminal positions to rotate the gear to advance the record to its next position of rest, the pitch of the notches on the record and the pitch of the gear being an even multiple of the distance between the transverse runs of the sound track on the record, said third means comprising a ratchet device and a third solenoid coil energized in the two terminal positions of the head for actuating said ratchet device, means providing a common axis for the ratchet device and said control switch and mechanically connected with said gear to advance the record, whereby said first, second and third means are operatively connected and coordinated such that when the record is operatively mounted on the device the head is actuated in each of its movements on the sound track in a direction corresponding to the direction in which the sound track was initially made on the record.

References Cited in the file of this patent

UNITED STATES PATENTS

| | | |
|---|---|---|
| 462,687 | Bruening | Nov. 10, 1891 |
| 2,124,673 | Puma | July 26, 1938 |
| 2,127,331 | Fulton | Aug. 16, 1938 |
| 2,245,286 | Marzocchi | June 10, 1941 |
| 2,546,829 | Mallina | Mar. 27, 1951 |

FOREIGN PATENTS

| | | |
|---|---|---|
| 877,126 | France | Nov. 27, 1942 |
| 1,041,699 | France | Oct. 26, 1953 |